United States Patent
Warakomski et al.

(10) Patent No.: US 10,174,148 B2
(45) Date of Patent: Jan. 8, 2019

(54) CURED PHENOLIC SPHERES AND METHOD OF PRODUCING THE SAME

(71) Applicants: DUREZ CORPORATION, Novi, MI (US); SUMITOMO BAKELITE CO., LTD, Shinagawa-ku, Tokyo (JP)

(72) Inventors: Todd Warakomski, Niagara Falls, NY (US); Matsuo Yoshihiro, Shizuoka (JP)

(73) Assignees: DUREZ CORPORATION, Novi, MI (US); SUMITOMO BAKELITE CO., LTD., Tokyo (JP)

( * ) Notice: Subject to any disclaimer, the term of this patent is extended or adjusted under 35 U.S.C. 154(b) by 89 days.

(21) Appl. No.: 15/041,070

(22) Filed: Feb. 11, 2016

(65) Prior Publication Data

US 2016/0229944 A1      Aug. 11, 2016

Related U.S. Application Data

(60) Provisional application No. 62/114,894, filed on Feb. 11, 2015.

(51) Int. Cl.
   *B32B 5/16* (2006.01)
   *C08L 61/06* (2006.01)
   *C08G 8/10* (2006.01)
   *C08J 5/00* (2006.01)

(52) U.S. Cl.
   CPC .................. *C08G 8/10* (2013.01); *C08J 5/00* (2013.01); *C08L 61/06* (2013.01); *C08J 2361/10* (2013.01); *C08J 2429/04* (2013.01)

(58) Field of Classification Search
   CPC ........................................... C08L 61/06
   USPC ............................ 525/132; 428/402
   See application file for complete search history.

(56) References Cited

U.S. PATENT DOCUMENTS

| 4,206,095 A | 6/1980 | Wynstra et al. |
| 4,366,303 A | 12/1982 | Kopf |
| 4,748,214 A | 5/1988 | Asami et al. |
| 4,839,445 A * | 6/1989 | Echigo .............. C08J 3/16 |
| | | 525/503 |
| 2012/0271028 A1* | 10/2012 | Sumner .............. C08G 8/10 |
| | | 528/146 |

FOREIGN PATENT DOCUMENTS

| JP | 2000/239336 A | 9/2000 |
| JP | 2000/256431 A | 9/2000 |
| JP | 3159443 * | 4/2001 |
| JP | 2013/023616 A | 2/2013 |

OTHER PUBLICATIONS

Google translation JP 3159443B2 (Date: Apr. 23, 2001) (Year: 2001).*
Prakash Mahanwar: "Phenolic Resins", Matunga, Mumbai 400 019, India; pp. 1-50—downloaded from http://www.ipiindia.org/materialstask=callelement&format=raw&item_id=939&element=cf0577f3-519f-4fe3-9d25-658179076aff&method=download.

* cited by examiner

Primary Examiner — Hoa (Holly) Le
(74) Attorney, Agent, or Firm — Balaram Gupta

(57) ABSTRACT

A process for the production of high compressive strength microspheres of cured phenolic resins are disclosed. Specifically, the microspheres formed by this process exhibit excellent viscoelastic properties in that the microspheres retain their shape even after applying a load of at least 4 GPa at 2.5 percent strain, and exhibit high hardness of at least about 0.3 GPa.

16 Claims, 2 Drawing Sheets

CURED PHENOLIC SPHERES AND METHOD OF PRODUCING THE SAME

CROSS REFERENCE TO RELATED APPLICATIONS

This application claims the benefit of U.S. Provisional Application No. 62/114,894, filed Feb. 11, 2015, which is incorporated herein by reference in its entirety.

BACKGROUND OF THE INVENTION

Field of the Invention

The current invention relates to phenolic spheres having improved viscoelasticity and decomposition temperature and a method of their making.

Description of the Art

Phenolic spheres are produced by combining phenol with formalin (an aqueous solution of formaldehyde) in the presence of a catalyst and an emulsion stabilizer. When processed under appropriate conditions spheres of a phenolic resin are formed. Inherently cured phenolic spheres thus formed are traditionally brittle and thus fractures under minimal load. As a result their potential applications are very limited.

For instance, U.S. Pat. No. 4,206,095 discloses a process for producing particulate resoles from aqueous dispersion which combines 100 parts phenol and 90 parts formalin (i.e., a 0.9 formalin/phenol, F/P ratio). Hexamethylenetetramine is used as a catalyst with gum arabic as a protective colloid. As described therein the components are combined at about 85° C. for about 2.5 hours to form the phenolic spheres. The spheres formed in this manner are curable and will melt and coalesce, thus are unsuitable in any high temperature applications.

U.S. Pat. No. 4,366,303 discloses a process for producing particulate resoles with improved cure rate and sinter resistance which combines 100 parts phenol with 72 parts formalin (0.72 F/P ratio), hexamethylenetetramine as a catalyst with polyvinyl alcohol at about 0.4 parts per 100 parts phenol as a protective colloid. As described therein the components are combined at about 85° C. for about 1 hour and 10 minutes to form the phenolic spheres. Again, even though the spheres formed in this manner are curable but they will still melt and coalesce, thus are not suitable for high temperature applications.

Finally, U.S. Pat. No. 4,748,214 discloses a process for the production of microspherical cured phenolic resin particles having a particle diameter of not more than about 100 μm formed from novolak resin, which are useful as modifier or filler for various plastics and rubbers.

Accordingly, it is an object of this invention to provide high temperature resistant phenolic spheres exhibiting improved thermo-mechanical properties, among others. It is further an object of this invention to provide cured phenolic spheres of narrow size distribution which exhibit high compressive strength. It is further an object of this invention to provide cured phenolic spheres having hitherto unattainable compressive strength and do not fracture even when subjected to very high loads and retain the shape when the load is released. The phenolic spheres of this invention therefore find a number of applications where such high temperature and compressive strength materials are needed, including as reinforcing agents in a number of applications.

SUMMARY OF THE INVENTION

Surprisingly, it has now been found that a combination of phenol with formalin at an F/P ratio of higher than about 1 and up to about 3 with a protective organic colloid, such as a medium viscosity hydrolyzed polyvinyl acetate and a catalyst in an aqueous medium provides phenolic spheres exhibiting hitherto unattainable thermo-mechanical properties. The resulting composition is cured for a processing time sufficient to form fully cured particles having a mean particle diameter higher than 100 microns and can be tailored to make cured phenolic spheres having a narrow size distribution and having varied mean diameter sizes varied from about 100-1000 microns depending upon the intended applications. The cured phenolic resin spheres are viscoelastic and when tested under high compressive loads, do not fracture and when the load is released the spheres return to its original shape.

Accordingly there is provided a process for the production of cured phenolic spheres having an average particle diameter of greater than 100 microns, comprising:

reacting a phenolic compound and an aldehyde in an aqueous medium in the presence of a basic catalyst and an emulsion modifier, at a temperature from about 95-105° C.

In another aspect of this invention there is also provided a spherical cured phenolic resin composition having an average particle diameter greater than about 100 μm, which particles exhibiting a compressive strength of at least 4 GPA at a strain of about 2.5 percent and an average hardness of at least 0.3 GPa.

BRIEF DESCRIPTION OF THE DRAWINGS

Embodiments in accordance with the present invention are described below with reference to the following accompanying figures and/or images. Where drawings are provided, it will be drawings which are simplified portions of a device provided for illustrative purposes only.

DETAILED DESCRIPTION

Figure 1:
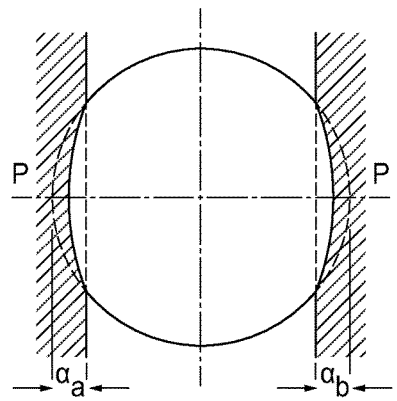
FIG. 1 illustrates the determination of compression strength of the phenolic spheres of this invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "F/P molar ratio" means a molar ratio of formalin/formaldehyde to phenol. If other than formaldehyde is used as an aldehyde then such aldehyde or a mixture of aldehydes can be constituted as the moles of "F" and the combined moles of phenol with any other phenol used shall be constituted as "P."

As used herein, "formalin" shall have the generally accepted meaning in the art, which includes an aqueous solution of formaldehyde, generally from 37 to 50 weight percent of formaldehyde in water. However, various other forms of formaldehyde, such as for example, paraform, paraformaldehyde and trioxane, which are generally available in the solid form, can also be employed in this invention.

As used herein, "resole" shall have the generally accepted meaning in the art, which includes a phenolic resin produced using at least equimolar amounts of phenol and aldehyde, and usually more, of aldehyde. Base catalysts are ordinarily used in making resoles. As used in the art, "resole" refers to phenolic resins that contain useful reactivity, as opposed to the fully polymerized or cured resins.

Accordingly there is provided a process for the production of cured phenolic spheres having an average particle diameter of greater than 100 microns, comprising:

reacting a phenolic compound and an aldehyde in an aqueous medium in the presence of a basic catalyst and an emulsion modifier, at a temperature from about 95-105° C.

The phenolic spheres formed as described herein are highly viscoelastic, meaning that under significant load the spheres compress, do not fracture and when the load is released the sphere returns to its original shape. Moreover, the phenolic spheres also demonstrate a remarkably high decomposition temperature, meaning that they exhibit a high degree of heat resistance.

In some other embodiments of this invention, the process for the production of cured phenolic spheres having a particle diameter of 100-1000 microns consists of reacting phenol and an aldehyde in an aqueous medium in the presence of a catalyst and an emulsion stabilizer at a temperature from about 95-105° C., in some other embodiments from about 98-102° C. Generally, the process of this invention affords cured phenolic resin spheres having a mean diameter of greater than 100 microns, but can range from 100 to 1000 microns.

Generally, the process of this invention can be carried out for a time period of about 3-7 hour depending upon the intended result, i.e., particle size distribution and other thermo-mechanical properties. However, as one skill in the art will readily appreciate, it is possible that the reaction times can be much shorter or longer depending upon the intended result. Accordingly, in some other embodiments the reaction time can range from 4-6 hours. In some other embodiments the reaction time can be less than 3 hours and in some other embodiments the reaction time can be longer than 7 hours.

Generally, the molar amounts of the aldehyde employed in the process of this invention is higher than that of the phenol. However, any of the other amounts that would bring about the intended result can be employed herein. Accordingly, in one of the embodiments the molar ratio of the aldehyde to phenol is higher than 1. In some other embodiments the molar ratio of the aldehyde to phenol is from about 1 to about 3. In some other embodiments the molar ratio of the aldehyde to phenol is about 1.7.

Advantageously, it has now been found that employing an aldehyde to phenol ratio greater than one will result in a resole which produces phenolic spheres featuring both high temperature resistance as well as desirable improved mechanical properties. That is, if formaldehyde, i.e., formalin is used as the aldehyde, the F/P molar ratio is such that the resulting resin is a resole, therefore, the F/P molar ratio for these examples are 1 and above.

The aqueous solution is at a level that allows the system to mix freely during the sphere generation and curing steps of the process. Surprisingly, it has now been found that the water concentration has minimal effect on the resulting size of the phenolic spheres. As it is apparent from the examples that follow, increased or decreased amount of water content of the formulation will not change the particle size distribution of the cured spheres that are formed.

Any of the known catalysts, which are generally used in the formation of phenol-formaldehyde resins can be employed in the process of making the phenolic spheres of this invention. Generally the catalyst employed in the process of this invention is a basic catalyst. A suitable example of such catalyst is a basic amine. Various amines can be employed, including without any limitation, $(C_1-C_4)$alkyl amines, di$(C_1-C_4)$alkyl amines, tri$(C_1-C_4)$alkyl amines, aryl amines, and the like. Exemplary amines including without any limitation, trimethylamine, triethylamine, tri-n-propylamine, tri-iso-propylamine, tri-n-butylamine, tri-tert-butylamine, pyridine, aniline, and the like. In one of the embodiments of this invention the catalyst used is trimethylamine.

Any of the amounts of catalyst can be employed which will bring about the intended effect. In general the parts ratio of phenol to catalyst is 100 parts of phenol to at least 2 parts of catalyst. In another embodiment, about 2 to 5 parts of catalyst per 100 parts of phenol is used. In yet another embodiment 3 parts of catalyst is used per 100 parts of phenol. In general, it has now been observed that the amount of catalyst which affords a solution pH of 8-9 is suitable to the syntheses of a resole resin of this invention. Accordingly, the amount of catalyst may vary depending upon the basicity of the catalyst and the amount that is required to obtain a solution of pH of 8-9.

Advantageously, it has now been found that the emulsion stabilizer that can be employed in this invention is a protective organic colloid, such as a medium viscosity hydrolyzed polyvinyl acetate (resulting in polyvinyl alcohol). It has now been observed that in order to obtain the best results the emulsion stabilizer employed is a partially hydrolyzed polyvinyl acetate, which is at least 90 percent hydrolyzed to polyvinyl alcohol. Any suitable amount of such partially hydrolyzed polyvinyl acetate can be employed. In some embodiments the partially hydrolyzed polyvinyl acetate, which is hydrolyzed from about 91% to 94%, is present in the amount of 0.1 to 12 parts per 100 parts of phenol. In some other embodiments the emulsion stabilizer is present in the amount of 1.6 parts per 100 parts phenol. When the emulsion stabilizer is increased or decreased from the above noted 1.6 parts the particle size of the spheres decrease and increase respectively. For example, when the emulsion stabilizer is 0.25 parts per 100 parts of phenol the mean particle size of the spheres is approximately 600 microns and conversely when the emulsion stabilizer is 10 parts per 100 parts of phenol the mean particle size of the spheres is approximately 20 microns. Accordingly, the amount of emulsion stabilizer employed is tailored to the desired particle size of the phenolic spheres.

Various other known emulsion stabilizers can also be employed to form the cured phenolic spheres of this invention. Other exemplary emulsion stabilizers that can be employed include without any limitation, gelatin, casein, gum arabic, gum ghatti and hydroxyalkylated guar gum, among others.

It has also been found that continuous stirring of the composition throughout the process with a stirrer speed of about 20 to 400 rpm affords desirable results. However, as one of skill appreciates, any of the other stirring speeds and/or procedures that would bring about similar results can also be employed in the process of this invention. In one of the embodiments, the stirrer speed is maintained around 180 to 350 rpm.

As noted hereinabove, the phenolic resins employed in the process of this invention can be formed from any of the known phenolic compound and an aldehyde as is customarily known to form such phenolic resins. Non-limiting examples of such phenolic compound is selected from the group consisting of phenol, o-cresol, m-cresol, p-cresol, 2,3-xylenol, 2,4-xylenol, 2,5-xylenol, 2,6-xylenol, 3,4-xylenol, 3,5-xylenol, resorcinol, bisphenol-A and bisphenol-S. It should further be noted that one or more such phenolic compound can be employed together to form the phenolic resin and the spheres formed therefrom.

Similarly, non-limiting examples of aldehydes that can be employed in the process of this invention are one more of aldehydes selected from the group consisting of formaldehyde, acetaldehyde, propionaldehyde, n-butyraldehyde, iso-butyraldehyde, glyoxal and furfural.

In some embodiments the phenolic compound used is phenol and the aldehyde employed is formaldehyde in the form of formalin solution.

In another embodiment there is further provided a spherical cured phenolic resin produced by the process of this invention as described herein.

In another aspect of this invention there is also a provided a spherical cured phenolic resin composition having an average particle diameter greater than about 100 µm. The cured phenolic spheres of this invention exhibit extremely high temperature resistance, excellent viscoelastic properties and very high compressive strength. In general, the cured spherulitic particles formed from the phenolic resin of this invention exhibit a compressive strength of at least 4 GPA at a strain of about 2.5 percent and an average hardness of at least 0.3 GPa.

As described above the spheres as formed in accordance with this invention can be tailored to form spheres of any desired dimensions. In some embodiments, the average particle diameter of the spheres is in the range from about 200 to about 300 µm. In some other embodiments, the average particle diameter of the spheres is in the range from about 300 to about 500 µm, and in some other embodiments it can be higher than 500 µm.

The cured phenolic resin spheres as described herein encompasses a phenolic compound, an aldehyde, polyvinyl acetate which is at least 90% hydrolyzed and a base catalyst.

Again, the phenolic spheres as described herein are formed from any of the phenolic compound selected from the group consisting of phenol, o-cresol, m-cresol, p-cresol, 2,3-xylenol, 2,4-xylenol, 2,5-xylenol, 2,6-xylenol, 3,4-xylenol, 3,5-xylenol, resorcinol, bisphenol-A and bisphenol-S.

Similarly, the phenolic spheres as described herein are formed from any of the aldehyde selected from the group consisting of formaldehyde, acetaldehyde, propionaldehyde, n-butyraldehyde, iso-butyraldehyde, glyoxal and furfural.

In some embodiments the phenolic spheres of this invention encompasses phenol and formaldehyde.

Advantageously, it has also been found that the phenolic spheres of this invention are prepared using an unmodified phenolic resin. However, there are multiple ways to enhance the properties of the spheres based upon the specific intended applications and desirable specifications as one of skill in the art readily appreciates. For example, the resin may be modified with additives that are either reacted into the phenolic backbone and/or added into the aqueous solution before the resin is synthesized which would incorporate the additive into the sphere. Any of the known additives that would bring about the intended benefit can be utilized. Exemplary additives that may be employed include, without any limitation, epoxy, rubber, cashew, phenoxy, frame retardants, melamine, silicone, among other such suitable additives.

The phenolic spheres of this invention find use as fillers and modifiers, among other uses, for a variety of materials which need further reinforcement of thermal and mechanical properties and or other compatible properties depending upon the intended applications. Non-limiting examples of such applications may include but are not limited to reinforcing agents for cement, proppant additives for the oil and gas industry, as a potential filler for bonded, coated abrasives, vitrified abrasives, friction materials, molding compounds, foams, carbon source for graphite fibers and composites in general.

The proppant additives for the oil and gas industry currently use sand, ceramic spheres and rubber as lightweight proppant for fracking. The phenolic spheres of this invention may offer additional advantages in such applications. Bonded and coated abrasives currently use alumina, silicon carbide, ceramic grains, and to further densify the wheel glass spheres other friable raw materials are used. The phenolic spheres of this invention may be useful in such applications.

EXAMPLES (GENERAL)

The following examples illustrate a general procedure for carrying out various aspects of the invention as described herein. It should be understood, however, that the invention is not limited to the following examples.

The chemical designation and the abbreviations used in the following examples are defined as follows: formalin: an aqueous solution containing 45% formaldehyde; basic catalyst: tri-ethylamine; PVOH, emulsion stabilizer as a protective organic colloid: a commercially available polyvinyl alcohol/vinyl acetate copolymer having a hydrolysis mole % of 98-98.8%—typically available commercially as Selvol™ 325 from Sekisui Specialty Chemicals; other fully hydrolyzed PVOH grade used, Selvol 125-99.7±0.3 mol % hydrolyzed; other partially hydrolyzed PVOH polymers used were: Selvol 425-95.5-96.5 mol % hydrolyzed; Selvol 418-92 mol % hydrolyzed; Selvol 443-93 mol % hydrolyzed; and Selvol 203-87-89 mol % hydrolyzed; F/P—formalin/phenol mole ratio.

The following Examples 1 to 3 illustrate the process of making the cured phenolic resins of this invention and the effect of varying the molar ratio of aldehyde to phenolic compound, F/P.

Example 1

A 5 liter three-necked flask equipped with a stirrer, temperature probe and condenser was charged with phenol (1100 g), formalin (1100 g) (formaldehyde/phenol (F/P) molar ratio is 1), water (1688 g), tri-ethylamine (33 g) and PVOH flake (Selvol™ 325, 17.5 g). Each of the constituents was charged in the order listed until all are in the flask within about 10 to 20 minutes.

The system was heated to 98-102° C. under atmospheric reflux conditions, at 350 rpm stirrer speed and held at this temperature for 5 hours to form/cure the phenolic spheres. Then the contents of the flask were cooled to room temperature and filtered to remove the water layer. The resulting cured phenolic spheres were then spread out and air dried for 48 hours at room temperature. The resulting dry free flowing cured phenolic spheres have a particle size distribution substantially in the range of 100 to 1000 microns. The particles were filtered, dried and sieved to have a mean diameter of 200 µm to 300 µm.

Example 2

A 5 liter three-necked flask equipped with a stirrer, temperature probe and condenser was charged with phenol (1000 g), formalin (1205 g) (F/P molar ratio is 1.71), water (1688 g) tri-ethylamine (30 g) and PVOH flake (Selvol™ 325, 17.5 g). Each of the constituents was charged in the order listed until all are in the flask within about 10 to 20 minutes.

The system was heated to 98-102° C. under atmospheric reflux conditions, at 350 rpm stirrer speed and held at this temperature for 5 hours to form/cure the phenolic spheres. Then the contents of the flask were cooled to room temperature and filtered to remove the water layer. The resulting cured phenolic spheres were then spread out and air dried for 48 hours at room temperature. The resulting dry free flowing cured phenolic spheres have a particle size distribution substantially in the range of 100 to 1000 microns. The particles were filtered, dried and sieved to have a mean diameter of 200 µm to 300 µm.

Example 3

A 5 liter three-necked flask equipped with a stirrer, temperature probe and condenser was charged with phenol (700 g), formalin (1500 g) (F/P molar ratio is 3), water (1688 g) tri-ethylamine (30 g) and PVOH flake (Selvol™ 325, 17.5 g). Each of the constituents was charged in the order listed until all were in the flask within about 10 to 20 minutes.

The system was heated to 98-102° C. under atmospheric reflux conditions, at 350 rpm stirrer speed and held at this temperature for 5 hours to form/cure the phenolic spheres. Then the contents of the flask were cooled to room temperature and filtered to remove the water layer. The resulting cured phenolic spheres were then spread out and air dried for 48 hours at room temperature. The resulting dry free flowing cured phenolic spheres have a particle size distribution substantially in the range of 100 to 1000 microns. The particles were filtered, dried and sieved to have a mean diameter of 200 µm to 300 µm.

Washing Step

As noted above, in order to narrow the particle size distribution and to clean the spheres washing the product mixture with water at room temperature was performed. In the above examples 1000 ml of water was added to the flask and mixed for 5 minutes. At the end of 5 minutes agitation was stopped and the system allowed to settle for 2 minutes and the top water layer from the flask was decanted. These steps were repeated until the water layer was clear. This allowed the phenolic resin spheres thus formed to filter more efficiently and readily flow after drying. Then the phenolic spheres thus formed were sieved to obtain phenolic spheres having mean diameter of 200 µm to 300 µm.

The filtered cured phenolic spheres from Examples 1-3 were used as such to determine their thermo-mechanical properties as detailed below.

Sample Testing

A set of particles from Examples 1-3 were tested for determining the mechanical properties through nano-scale compression testing and nanoindentation testing. The particles were mounted using two different techniques. For compression testing, a set of particles were dispersed onto the surface of a sapphire slide with no adhesive applied. The particles for nanoindentation testing were fixed in place using a thin film of epoxy; during the application, painters tape was used to keep the apex of the spheres clean and free of epoxy.

Compression Test

A custom test method was used for conducting the particle compression tests using a flat punch indentation tip. Particles were analyzed for elastic modulus according to the model for a sphere between two parallel planes in accordance with the procedures set forth by M. J. Puttock, E. G. Thwaite, "Elastic Compression of Spheres and Cylinders at Point Contact and Line Contact." National Standards Laboratory Technical Paper No. 25. CSIRO, Melbourne, (1969). Pertinent portions of which are incorporated herein by reference.

Particles were analyzed for elastic modulus according to a derivative form of the model for a sphere compressed between two parallel planes, which is illustrated in FIG. 1, where P is the applied force at each of the left and right platens, $\alpha_a$ is the elastic compression distance or the deflection at the left platen, and $\alpha_b$ is the elastic compression distance or the deflection at the right platen. The platens used for performing the compression tests were sapphire and diamond. The selected platens have elastic properties that are at least two orders of magnitude larger than that of the sphere material (412 GPa and 1,140 GPa for sapphire and diamond, respectively) and, therefore, have negligible deflection. FIG. 1 illustrates the analysis for a sphere between two parallel platens, where E is the elastic modulus, $\alpha$ is the combined elastic compression distance or the deflection at the left and right platens, P is the applied force, D is the particle diameter, ν is the particles Poisson's ratio, and S is the measured dynamic stiffness.

$$E_{Static} = \frac{3P(1-v^2)}{\alpha \frac{2}{3} \sqrt{D}} \quad (1)$$

$$E_{Dynamic} = \frac{2S(1-v^2)}{\sqrt{\alpha D}} \quad (2)$$

All of the test parameters used for conducting the compression tests of the samples from Examples 1 to 3 are summarized in Table 1.

TABLE 1

| | |
|---|---|
| Maximum Compression Force | 500 mN |
| Strain Rate for Loading | 0.1 1/s |
| Dynamic Test Frequency | 45 Hz |
| Dynamic Displacement Amplitude | 15 nm |
| Poisson's ratio | 0.49 |
| Flat Punch Diameter | 99.81 µm |

TABLE 1-continued

| Particle Diameter | as measured |
| --- | --- |
| Temperature | 25° C. |
| Strain for reporting E | 1.5% |

Nanoindentation Test

The nanoindentation tests were completed using a sharp pointed indenter tip to measure the surface properties of the particles and to provide a comparison of measured mechanical properties to the compression tests. Sharp pointed indentation tips allow the measurement of both elastic modulus and hardness as a function of penetration depth. Compression of the particle during this test is not desirable so the sample was constrained in epoxy to provide a ridged mount. All of the samples were tested using the MTS-Nanoindenter XP with the continuous stiffness measurement (CSM). The CSM option was used to superimpose a small harmonic oscillation on top of the loading curve and it provided the data required to evaluate the evolution of mechanical properties as the diamond tip penetrated the sample; the CSM technique is described in detail in W. C. Oliver and G. M. Pharr, "An improved technique for determining hardness and elastic modulus using load and displacement sensing indentation experiments." J. Mater. Res., 7(6): 1564-1583 (1992). Mechanical properties were calculated using the standard Oliver-Pharr analysis for dynamic indentation as set forth therein. Pertinent portions of which are incorporated herein by reference. All of the test parameters used in testing the samples of Examples 1 to 3 are summarized in Table 2.

TABLE 2

| Depth Limit | 3000 nm |
| --- | --- |
| Strain Rate Target | 0.1 1/s |
| Harmonic Displacement Target | 5 nm |
| Poisson's Ratio | 0.49 |
| Frequency Target | 45 Hz |

Results

Compression Test

A total of 10 samples from Example 2 were filtered to obtain mean particle size distribution of each of the samples in the range from 166 to 230 microns and each of the samples was subjected to compression testing to measure the quasi-static elastic modulus and the dynamic elastic modulus. The results for the average quasi-static elastic modulus (Average Modulus) and the average dynamic elastic modulus (Average Dynamic Modulus) for each of these samples are summarized in Table 3.

TABLE 3

| Specimen No. | Particle Diameter (μm) | Average Modulus (GPa) | Average Dynamic Modulus (GPa) |
| --- | --- | --- | --- |
| 5 | 166 | 4.3 | 4.99 |
| 15 | 175 | 4.73 | 4.98 |
| 14 | 180 | 4.65 | 5.12 |
| 10 | 184 | 5.13 | 5.16 |
| 6 | 188 | 4.74 | 5.1 |
| 1 | 191 | 1.76 | 3.13 |
| 11 | 200 | 3.53 | 3.8 |
| 17 | 207 | 1.3 | 3.82 |
| 8 | 220 | 3.24 | 4.15 |
| 13 | 230 | 4.02 | 4.58 |

Figure 2:
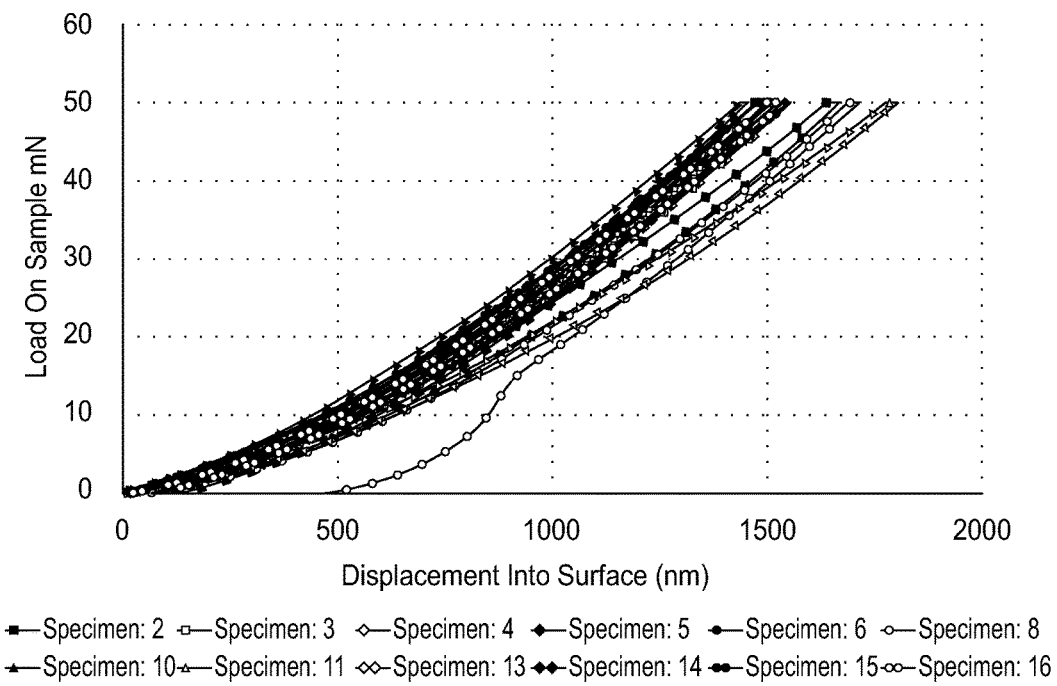
FIG. 2 shows the relationship between the compression force (load on sample) and the compression distance (displacement into surface) for a few of the phenolic spheres tested using the compression test as described herein.

FIG. 2 shows the compression force (load on sample) versus the compression distance (displacement into surface) for each of the compression tests. It is observed, from the consistency in the shape of the loading and unloading curves, that all of the tests show excellent elastic deformation of the spheres—a small amount of hysteresis is observed that is most likely due to damping effects of the sphere material. Variations in the load vs displacement curves are primarily due to variation in the diameters of the tested particles. Also listed in FIG. 2 is the specimen number for each of the tested samples, which correspond to the specimen numbers listed in Table 3, however, a few of the samples listed in FIG. 2, such as for example, Specimen Nos. 2, 3, 4 and 16 were not included in the compression test as summarized in Table 3.

Nanoindentation Tests of Example 2

A total of 18 samples from Example 2 were tested by nanoindentation test as described herein. The test was carried out on the apex of the spheres to measure the elastic modulus and hardness using a distinctly different technique from the compression tests. The nanoindentation method measures more localized properties as compared to the flat plate compression tests. These particles were mounted on a thin film of epoxy to fix the samples in place and to provide a rigid mount; painter's tape was used to mask the surface and keep epoxy off of the apex of the particles during mounting. The average results for each of these samples from the indentation test are summarized in Table 4.

TABLE 4

| Sample No. | Avg. Modulus (GPa) | Avg. Hardness (GPa) |
| --- | --- | --- |
| 1 | 4.6 | 0.4 |
| 2 | 4.7 | 0.43 |
| 3 | 4.8 | 0.5 |
| 4 | 5.1 | 0.54 |
| 5 | 4.9 | 0.54 |
| 6 | 5.1 | 0.51 |
| 7 | 5.2 | 0.53 |
| 8 | 5 | 0.53 |
| 9 | 4.8 | 0.48 |
| 10 | 5.5 | 0.53 |
| 11 | 5.4 | 0.58 |
| 12 | 5.2 | 0.57 |
| 13 | 5.2 | 0.59 |
| 14 | 4.7 | 0.51 |
| 15 | 5 | 0.61 |
| 16 | 4.8 | 0.59 |
| 17 | 5.2 | 0.55 |
| 18 | 5.2 | 0.55 |

It is evident from the results summarized in Tables 3 and 4, there is an excellent agreement between the results of the indentation tests and the compression tests.

Second Compression Test of Examples 1-3

The mechanical properties of the samples from Examples 1 to 3 were similarly evaluated through micro-scale compression testing. All of the particles were micro-spheres, filtered to nominal mean particle size between 200 μm to 300 μm in diameter. A small number of particles from each of Examples 1 to 3 were dispersed onto the surface of a glass slide with no adhesive applied.

All of the samples were tested using an MTS-Nanoindenter XP. Twelve particle samples from each of the Examples 1 to 3 were subjected to compression testing. A custom test method was used for conducting the particle compression tests using a flat punch indentation tip. While continuously monitoring the deflection, a, each particle was compressed to a maximum force of 500 mN. During this semi-static compression, a harmonic force dither having a frequency of 45 Hz was superimposed in order to obtain a continuous measure of the particle stiffness, S. This dithering technique is well known in the field of instrumented indentation; for elastic materials, the stiffness, S, is calculated throughout loading as the amplitude of the force oscillation divided by the amplitude of the displacement oscillation. See W. C. Oliver and G. M. Pharr. "An improved technique for determining hardness and elastic modulus using load and displacement sensing indentation experiments." *J. Mater. Res.*, 7(6): 1564-1583 (1992), pertinent portions of which are incorporated by reference as noted above.

Particles were analyzed for elastic modulus according to a derivative form of the model for a sphere compressed between two parallel planes as detailed above and as illustrated schematically in FIG. 1. The platens used for performing the compression tests were glass and diamond. The compression platens have elastic properties much larger than that of the sphere material (72 GPa and 1140 GPa for glass and diamond, respectively) and, therefore, experience negligible deflection.

For this geometry, the elastic modulus (E) is related to stiffness (S), Poisson's ratio (v), deflection ($\alpha$), and particle diameter (D) according to equation (3):

$$E = \frac{2S(1-v^2)}{\sqrt{\alpha D}} \quad (3)$$

In order to normalize results for spheres of various sizes, strain was defined as the deflection divided by the particle diameter as in equation (4):

$$\varepsilon = \frac{\alpha}{D} \quad (4)$$

The diameter of each particle, D, was measured optically using the translation stages of the equipment. The uncertainty of the diameter measurement is ±2 μm. Final results for elastic modulus were reported at a strain of 2.5% across all tests on all particles and the maximum compression force used was 500 mN, and all other parameters used for conducting these compression tests were as summarized in Table 2.

Figure 3:
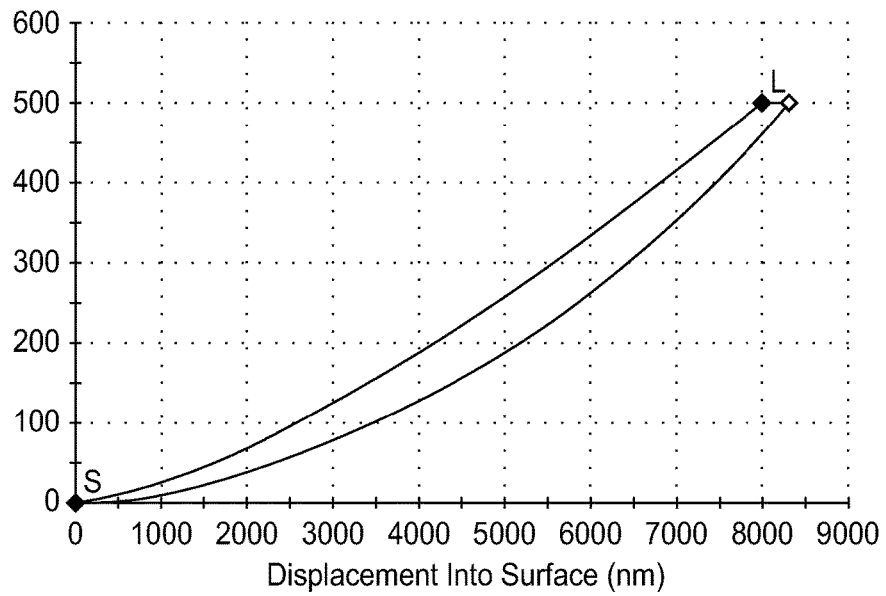
FIG. 3 is a plot of load on sample vs displacement into surface of one of the phenolic sphere sample of this invention.

All particles having mean particle diameter greater than 170 μm (i.e., D≥170 μm) recovered completely, though visco-elastically, from the imposed force of 500 mN. This is evidenced by the quantitative force-displacement data obtained to each particle. An exemplary force-displacement trace is shown in FIG. 3. The origin of the plot is the first point of contact between the diamond (indenter) platen and the sphere, S. Loading proceeds along the upper trace and terminates at point "L". Loading is allowed by a dwell at constant force which terminates at point "U". Unloading begins at point "U" and terminates when the diamond platen loses contact with the sphere or when the force is zero. The fact that the unloading trace returns to the origin of the plot is the primary indicator of complete elastic recovery. However, the fact that the unloading curve is always to the right of the loading curve indicates that this recovery is time-dependent, or visco-elastic. (If the deformation were purely elastic, the loading and unloading traces would coincide exactly.) The elastic recovery is further confirmed by the photographs of each sphere before and after testing. After testing, the spheres appear coherent, and are of about the same size as before testing.

Figure 4:
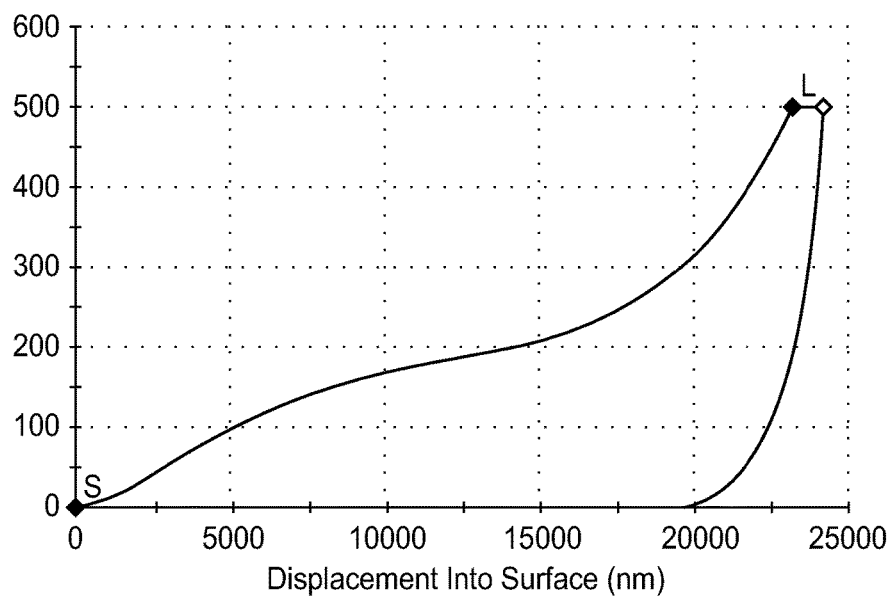
FIG. 4 illustrates a similar plot as in FIG. 3 for a particle outside the scope of this invention, i.e., a comparative example of this invention.

A few of the smallest particles from Example 2 having mean particle diameter of less than 170 μm (i.e., D<170 μm) experienced permanent deformation as indicated by the force-displacement trace and the before and after testing photographs. FIG. 4 shows the force displacement trace for the test on one of such particles of Example 2, were the mean diameter of the particle was only 70 μm. When the diamond platen loses contact (i.e. when the unloading trace crosses the x-axis) there is about 18000 nm (18 μm) of unrecovered deformation. This clearly shows that when particles having mean particle diameter of less than 170 μm would crush and do not show the same resilient effect as seen for the particles having mean particle diameter of greater than 170 μm as shown in FIG. 3.

Table 5 summarizes the results obtained for Examples 1 to 3 where mean particle diameter were greater than 170 μm. It is evident from the dynamic modulus results shown in Table 5 that the cured phenolic spheres are viscoelastic, under load the spheres compress, do not fracture and when the load is released the sphere returns to its original shape. The fact that when put under load the spheres compress, do not fracture and return to their original shape once the load is removed is very surprising and unexpected, especially as shown hereinabove in FIGS. 3 and 4. For comparative purposes also listed in Table 5 are the results obtained from Comparative Example 1 where formalin to phenol (F/P) ratio of 0.5 was used, which resulted in no phenolic spheres, thus evidencing that in order to form phenolic spheres of this invention F/P molar ratio of at least one should be employed.

TABLE 5

| | F/P Molar Ratio | Average Dynamic Modulus (@2.5% strain) (GPa) | Average Hardness (GPa) | TGA (5%) Decomposition Temperature (° C.) |
|---|---|---|---|---|
| Example 1 | 1 | 4.80 | 0.35 | 440.5 |
| Example 2 | 1.71 | 4.87 | 0.54 | 449.6 |
| Example 3 | 3 | 4.02 | 0.45 | 436.1 |
| Comparative Example 1 | 0.5 | Did not form spheres | | |

In order to confirm the results obtained in FIGS. 3 and 4 as well as to ascertain the effects of the particle size distribution on the compression strength particles of various different diameters were subjected to the compression test as described herein. The results are presented in Table 6. It is further evident from these results that the phenolic spheres of this invention having mean particle diameter having greater than 100 μm exhibit viscoelastic properties.

TABLE 6

| Sample No. | Mean Tested Diameter (μm) | Results |
|---|---|---|
| Sample 1 | 177 | Rebounded after the load was removed to original shape |
| Sample 2 | 303 | Rebounded after the load was removed to original shape |
| Sample 3 | 322 | Rebounded after the load was removed to original shape |
| Sample 4 | 308 | Rebounded after the load was removed to original shape |
| Sample 5 | 42 | Did not rebound after the load was removed, deformed |

The following Examples 4 to 6 further demonstrate that by employing various different levels of partially hydrolyzed polyvinyl acetate (PVOH) it is possible to control the mean particle size distribution (D50) of the resulting phenolic spheres. As evident from Examples 4 to 6, The concentration of PVOH in the reaction mixture controls the particle size of the cured phenolic spheres formed therefrom. The higher the concentration of PVOH the lower the particle size. Accordingly, following the procedures of this invention one can tailor the mean particle size distribution of the resulting phenolic spheres as desired for the intended applications.

Example 4

A 3 liter three-necked flask equipped with a stirrer, temperature probe and condenser was charged with phenol (380.25 g), formalin (458.25 g) (formaldehyde/phenol (F/P) molar ratio 1.71), water (642 g), tri-ethylamine (12.75 g) and PVOH flake (Selvol™ 325, 6.6 g). The reaction mixture was heated to 98-102° C. under atmospheric reflux conditions, at 350 rpm stirrer speed and held at this temperature for 5 hours to form and cure the phenolic spheres. After which time the reaction mixture was cooled to room temperature and then filtered to remove the water layer. The resulting cured phenolic spheres were then spread out and air dried for 48 hours at room temperature. The resulting dry free flowing cured phenolic spheres have a mean particle size distribution (D50) of 265 μm.

Example 5

A 3 liter three-necked flask equipped with a stirrer, temperature probe and condenser was charged with phenol (380.25 g), formalin (458.25 g) (formaldehyde/phenol (F/P) molar ratio 1.71), water (321 g), tri-ethylamine (12.75 g) and PVOH flake (Selvol™ 325, 6.6 g). The reaction mixture was heated to 98-102° C. under atmospheric reflux conditions, at 350 rpm stirrer speed and held at this temperature for 5 hours to form and cure the phenolic spheres. After which time the reaction mixture was cooled to room temperature and then filtered to remove the water layer. The resulting cured phenolic spheres are then spread out and air dried for 48 hours at room temperature. The resulting dry free flowing cured phenolic spheres have a mean particle size distribution (D50) of 123 μm.

Example 6

A 3 liter three-necked flask equipped with a stirrer, temperature probe and condenser was charged with phenol (380.25 g), formalin (458.25 g) (formaldehyde/phenol (F/P) molar ratio 1.71), water (963 g), tri-ethylamine (12.75 g) and PVOH flake (Selvol™ 325, 6.6 g). The reaction mixture was heated to 98-102° C. under atmospheric reflux conditions, at 350 rpm stirrer speed and held at this temperature for 5 hours to form and cure the phenolic spheres. After which time the reaction mixture was cooled to room temperature and then filtered to remove the water layer. The resulting cured phenolic spheres are then spread out and air dried for 48 hours at room temperature. The resulting dry free flowing cured phenolic spheres have a mean particle size distribution (D50) of 331 μm.

The following Examples 7 to 9 illustrate the effect of varying extent of hydrolysis of polyvinyl acetate (PVA) to form the PVOH flakes, which is used herein as an emulsion stabilizer, which results in different mean particle size distribution of the cured phenolic spheres as described herein.

Example 7

In this Example 7 Selvol 125 wherein PVA is 99.3+% hydrolyzed to PVOH was used. A 3 liter three-necked flask equipped with a stirrer, temperature probe and condenser was charged with phenol (380.25 g), formalin (458.25 g) (formaldehyde/phenol (F/P) molar ratio 1.71), water (642 g), tri-ethylamine (12.75 g) and PVOH flake (Selvol™ 125, 6.6 g). The reaction mixture was heated to 98-102° C. under atmospheric reflux conditions, at 350 rpm stirrer speed and held at this temperature for 5 hours to form and cure the phenolic spheres. At which time the reaction mixture was cooled to room temperature and then filtered to remove the water layer. The resulting cured phenolic spheres were then spread out and air dried for 48 hours at room temperature. The resulting dry free flowing cured phenolic spheres have a mean particle size distribution (D50) of 650 microns.

Example 8

The procedures of Example 7 were substantially repeated in this Example 8 except for using Selvol 425 wherein PVA is 95.5-96.5% hydrolyzed to PVOH. The resulting dry free flowing cured phenolic spheres have a particle size distribution of 300 microns.

Example 9

The procedures of Example 7 were substantially repeated in this Example 9 except for using Selvol 418 wherein PVA is 91-93% hydrolyzed to PVOH. The resulting dry free flowing cured phenolic spheres have a particle size distribution of 349 microns.

The results obtained from Examples 4, 7 to 9 and Comparative Example 2 are summarized in Table 7. Also listed in Table 7 is the various grades of PVOH used in each of these Examples 4, 7 to 9 and Comparative Example 2 and the parts PVOH used for 100 parts of phenol as well as the mean particle size distribution (D50) of the phenolic spheres formed in each of these Examples 4, 7 to 9 and Comparative Example 2. It is very clear from this data that under similar reaction conditions it is not possible to make any phenolic spheres using a PVOH which has lower than 91% hydrolyzed PVA. Also evident from this data is that the higher mean particle size distribution can be achieved with PVOH having high hydrolysis rate, i.e., substantially pure polyvinyl alcohol (PVOH). That is, as the percent hydrolyzed PVOH is increased the mean particle size (D50) of the spheres also increased.

TABLE 7

| Example No. | PVOH Grade | % Hydrolysis PVOH | Parts PVOH on 100 parts phenol | Particle Size (D50), μm |
|---|---|---|---|---|
| Example 7 | Selvol 125 | 99.3+ | 1.74 | 647 |
| Example 4 | Selvol 325 | 98.0-98.8 | 1.74 | 265 |
| Example 8 | Selvol 425 | 95.5-96.5 | 1.74 | 300 |
| Example 9 | Selvol 418 | 91-93 | 1.74 | 349 |
| Comp. Example 2 | Selvol 203 | 87.0-89.0 | 1.74 | Didn't Form Spheres |

The following Example 10 along with Example 4 and Comparative Example 3 illustrate the effect of amount of PVOH employed on the mean particle size (D50) of the phenolic spheres formed. As it is evident from these three Examples 4, 10 and 11, the particle size of the phenolic spheres generally decreases as the concentration of PVOH is increased.

Example 10

A 5 liter three-necked flask equipped with a stirrer, temperature probe and condenser was charged with phenol (1000 g), formalin (1205 g) (formaldehyde/phenol (F/P) molar ratio is 1.71), water (1688 g), tri-ethylamine (30 g) and PVOH flake (Selvol 325 2.5 g). The reaction mixture was heated to 98-102° C. under atmospheric reflux conditions, at 350 rpm stirrer speed and held at this temperature for 5 hours to form and cure the phenolic spheres. After which time the reaction mixture was cooled to room temperature and then filtered to remove the water layer. The resulting cured phenolic spheres are then spread out and air dried for 48 hours at room temperature. The resulting dry free flowing cured phenolic spheres have a mean particle size distribution (D50) of 745 microns.

The results obtained in Examples 4, 10 and Comparative Example 3 are summarized in Table 8 to show the effects seen clearly. The data summarized therein includes parts PVOH used per 100 parts of phenol and the mean particle size distribution (D50) of the phenolic spheres formed in these three Examples 4, 10 and Comparative Example 3. It is clearly evident from this data that the various different size phenolic spheres can be formed readily by simply changing the concentration of the PHOH. That is, in general, decreasing the concentration of PVOH results in larger size phenolic spheres. Accordingly, the process of this invention can be tailored to prepare phenolic spheres of desirable size.

TABLE 8

| Example No. | Parts PVOH Per 100 Parts Phenol | 50% Distribution (D50), microns |
| --- | --- | --- |
| Example 10 | 0.25 | 745 |
| Example 4 | 1.74 | 265 |
| Comp. Example 3 | 10 | 33.5 |

Example 11

This Example 11 illustrates that gum arabic can be used as a protective colloid in place of PVOH flake (Selvol).

A 3 liter three-necked flask equipped with a stirrer, temperature probe and condenser was charged with phenol (380.25 g), formalin (458.25 g) (formaldehyde/phenol (F/P) molar ratio is 1.71), water (642 g), tri-ethylamine (12.75 g) and gum arabic powder (6.6 g). The system is heated to 98-102° C. under atmospheric reflux conditions, at 350 rpm stirrer speed and held at this temperature for 5 hours to form and cure the phenolic spheres. After which time the reaction mixture was cooled to room temperature and then filtered to remove the water layer. The resulting cured phenolic spheres were then spread out and air dried for 48 hours at room temperature. The resulting dry free flowing cured phenolic spheres were then collected.

The following Comparative Examples 1 to 3 are provided hereinto to show that under certain conditions it is not possible to form the phenolic spheres of this invention. For instance, Comparative Example 1 illustrates that at a lower than one F/P molar ratio, it is not possible to form phenolic spheres, which is again compared with working Examples 1 to 3 in Table 5 above. Comparative Example 2 illustrates that when partially hydrolyzed PVA having lower than 91% hydrolyzed to PVOH is unsuitable as an emulsion stabilizer to form the phenolic spheres of this invention, and is compared with working Examples 4 and 7 to 9 in Table 7. Finally, Comparative Example 3 illustrates that it is important to have the right concentration of PVOH to form the phenolic spheres of this invention. That is, at 10 parts of PVOH per 100 parts of phenol results in phenolic spheres having mean particle size distribution (D50) lower than 100 microns and thus would not provide the much needed mechanical properties as provided by the phenolic spheres of this invention.

Comparative Example 1

A 6 liter three-necked flask equipped with a stirrer, temperature probe and condenser was charged with phenol (1625 g), formalin (575 g) (formaldehyde/phenol (F/P) molar ratio is 0.5), water (1688 g), tri-ethylamine (33 g) and PVOH flake (Selvol 325, 17.5 g). The reaction mixture was heated to 98-102° C. under atmospheric reflux conditions, at 350 rpm stirrer speed and held at this temperature for 5 hours to form and cure the phenolic spheres. After which time the reaction mixture was inspected to determine if spheres were produced. After inspection it was determined that there was no reaction between the phenol and formaldehyde and spheres were not produced under these conditions.

Comparative Example 2

The procedures of Example 7 were substantially repeated in this Comparative Example 2 except for using Selvol 203 wherein PVA is 87-89% hydrolyzed to PVOH. Even after three hours under the reaction conditions of Example 7, the phenolic resin did not disperse, therefore, the resin was still molten but starting to cure. Therefore the reaction was stopped and scrapped.

Comparative Example 3

A 5 liter three-necked flask equipped with a stirrer, temperature probe and condenser was charged with phenol (1000 g), formalin (1205 g) (formaldehyde/phenol (F/P) molar ratio is 1.71), water (1688 g), tri-ethylamine (30 g) and PVOH flake (Selvol 325, 100 g). The reaction mixture was heated to 98-102° C. under atmospheric reflux conditions, at 350 rpm stirrer speed and held at this temperature for 5 hours to form and cure the phenolic spheres. After which time the reaction mixture was cooled to room temperature and then filtered to remove the water layer. The resulting cured phenolic spheres were then spread out and air dried for 48 hours at room temperature. The resulting dry free flowing cured phenolic spheres have a mean particle size distribution of 33.5 microns.

Accordingly, the cured phenolic resin spheres of this invention are ideal to be used in cement, composites and any other material that needs flexibility, crack resistance, durability and ductility. Applications may include but are not limited to cement, proppant additives for the oil and gas industry, as a potential filler for bonded, coated abrasives, friction materials, molding compounds and composites in general.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. Spherical cured phenolic resin particles with an average particle diameter in the range from about 200 to about 650 microns are produced by a process comprising:
    reacting a phenolic compound and formaldehyde in an aqueous medium in the presence of a basic catalyst and polyvinyl acetate which is at least 90 percent hydrolyzed as an emulsion modifier, at a temperature from about 95-105 °C., wherein the molar ratio of the formaldehyde to phenolic compound is 1 or higher than 1; and wherein the spherical cured phenolic particles exhibit compressive strength of at least 4 GPa at a strain of about 2.5 percent and an average hardness of at least 0.3 GPa.

2. A process for the production of cured phenolic spheres having an average particle diameter in the range from about 200 to about 650 microns, comprising:

reacting a phenolic compound and formaldehyde in an aqueous medium in the presence of a basic catalyst and polyvinyl acetate which is at least 90 percent hydrolyzed as an emulsion modifier, at a temperature from about 95-105 °C., wherein the molar ratio of the formaldehyde to phenolic compound is 1 or higher than 1; and wherein the cured phenolic spheres exhibit compressive strength of at least 4 GPa at a strain of about 2.5 percent and an average hardness of at least 0.3 GPa.

3. The process of claim 2, wherein the molar ratio of the formaldehyde to phenolic compound is higher than 1.

4. The process of claim 2, wherein the molar ratio of the formaldehyde to phenol is from about 1 to about 3.

5. The process of claim 2, wherein parts of the basic catalyst is at least 2 parts per 100 parts of the phenolic compound.

6. The process of claim 2, wherein parts of the basic catalyst is from about 2 to 5 parts per 100 parts of the phenolic compound.

7. The process of claim 2, wherein the polyvinyl acetate is hydrolyzed from about 91% to 99.7% and is present in the amount of 0.1 to 1.74 parts of phenolic compound.

8. The process of claim 2, wherein the phenolic compound is selected from the group consisting of phenol, o-cresol, m-cresol, p-cresol, 2,3-xylenol, 2,4-xylenol, 2,5-xylenol, 2,6-xylenol, 3,4-xylenol, 3,5-xylenol, resorcinol, bisphenol-A and bisphenol-S.

9. The process of claim 2, wherein the phenolic compound is phenol.

10. The process of claim 9, wherein phenol and formaldehyde in the aqueous medium in the presence of the basic catalyst and the emulsion stabilizer is stirred at a stirrer speed of 20 to 400 rpm.

11. The process of claim 2, wherein the reaction is carried out for a period of 3-7 hours.

12. A spherical cured phenolic resin composition produced by the process of claim 2, which composition exhibiting a compressive strength of from about 4.02 GPa to about 4.87 GPA at a strain of about 2.5 percent and an average hardness of from about 0.35 GPa to about 0.54 GPa.

13. The composition of claim 12, wherein the phenolic resin comprises a phenolic compound, formaldehyde, polyvinyl acetate which is hydrolyzed from about 91% to 99.7% and is present in the amount of 0.1 to 1.74 parts of the phenolic compound, and a base catalyst.

14. The composition of claim 13, wherein the phenolic compound is selected from the group consisting of phenol, o-cresol, m-cresol, p-cresol, 2,3-xylenol, 2,4-xylenol, 2,5-xylenol, 2,6-xylenol, 3,4-xylenol, 3,5-xylenol, resorcinol, bisphenol-A and bisphenol-S.

15. The composition of claim 13, wherein the aldehyde is selected from the group consisting of formaldehyde, acetaldehyde, propionaldehyde, n-butyraldehyde, iso-butyraldehyde, glyoxal and furfural.

16. The composition of claim 13, wherein the phenolic compound is phenol.

* * * * *